(12) United States Patent
De La Cruz

(10) Patent No.: US 10,288,519 B2
(45) Date of Patent: May 14, 2019

(54) LEAK DETECTION SYSTEM

(71) Applicant: Adolfo De La Cruz, San Antonio, TX (US)

(72) Inventor: Adolfo De La Cruz, San Antonio, TX (US)

( * ) Notice: Subject to any disclaimer, the term of this patent is extended or adjusted under 35 U.S.C. 154(b) by 234 days.

(21) Appl. No.: 15/278,683

(22) Filed: Sep. 28, 2016

(65) Prior Publication Data

US 2018/0087996 A1 Mar. 29, 2018

(51) Int. Cl.
*G01M 3/28* (2006.01)

(52) U.S. Cl.
CPC ................................. *G01M 3/2815* (2013.01)

(58) Field of Classification Search
CPC .................................................. G01M 3/2815
USPC ........................................................ 73/40.5 R
See application file for complete search history.

(56) References Cited

U.S. PATENT DOCUMENTS

| | | | |
|---|---|---|---|
| 2,645,128 A * | 7/1953 | Walker | G01B 7/16 73/300 |
| 2,727,383 A * | 12/1955 | Ross | B08B 9/0321 29/407.01 |
| 3,756,072 A * | 9/1973 | MacMurray | G01M 3/26 73/40.5 R |
| 4,103,537 A * | 8/1978 | Victor | G01M 3/2807 73/40.5 R |
| 4,984,448 A * | 1/1991 | Jordan | G01M 3/02 73/40.5 R |
| 5,201,213 A * | 4/1993 | Henning | G01M 3/3236 73/40 |
| D338,839 S | 8/1993 | Akins | |
| 5,548,993 A * | 8/1996 | Alexander | G01M 3/2815 73/40.5 R |
| 6,317,051 B1 | 11/2001 | Cohen | |
| 6,651,486 B1 * | 11/2003 | Johnson | G01M 3/2815 73/40 |
| 7,331,217 B2 * | 2/2008 | O'Sullivan | G01M 3/2815 73/40 |
| 7,900,647 B2 | 3/2011 | Tornay | |
| 2004/0118186 A1 | 6/2004 | Shultis | |
| 2005/0016261 A1 | 1/2005 | Yoncuski | |
| 2011/0232770 A1 | 9/2011 | Baggett | |

FOREIGN PATENT DOCUMENTS

WO WO 2008/0128128 A2 * 10/2008

* cited by examiner

*Primary Examiner* — Daniel S Larkin

(57) ABSTRACT

A leak detection system includes an air source. A pipe is provided and the pipe is buried underground. The pipe has an inlet and the inlet is exposed with respect to ground. A fitting is selectively fluidly coupled between the air source and the inlet. Thus, the fitting pressurizes the pipe with air. The fitting includes a gauge. The gauge communicates air pressure within the pipe. Thus, the air pressure may be monitored to detect a leak in the pipe.

6 Claims, 4 Drawing Sheets

LEAK DETECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to detection devices and more particularly pertains to a new detection device for pressure testing an underground water pipe.

BRIEF SUMMARY OF THE INVENTION

An embodiment of the disclosure meets the needs presented above by generally comprising an air source. A pipe is provided and the pipe is buried underground. The pipe has an inlet and the inlet is exposed with respect to ground. A fitting is selectively fluidly coupled between the air source and the inlet. Thus, the fitting pressurizes the pipe with air. The fitting includes a gauge. The gauge communicates air pressure within the pipe. Thus, the air pressure may be monitored to detect a leak in the pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
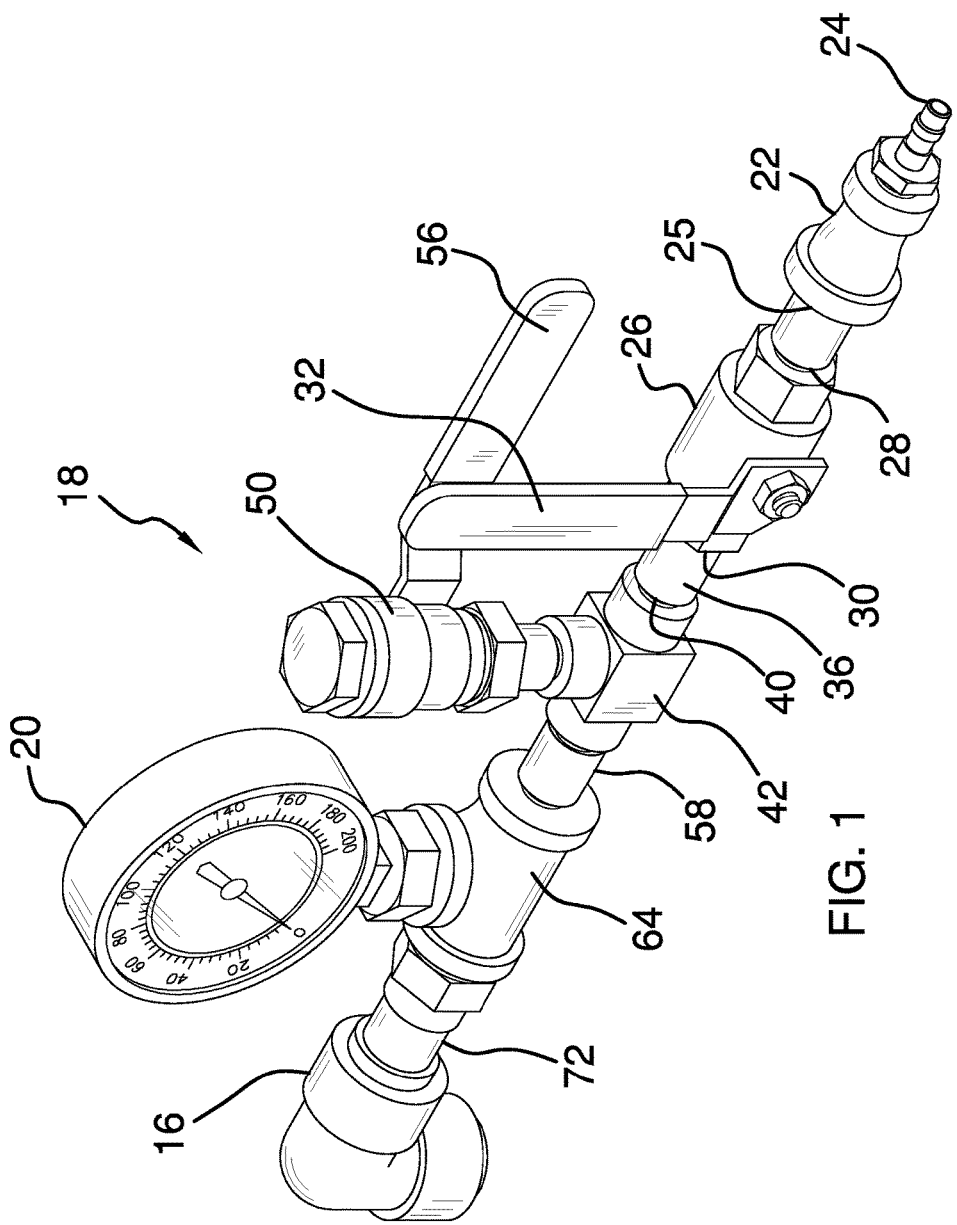
FIG. 1 is a perspective view of a leak detection system according to an embodiment of the disclosure.
Figure 2:
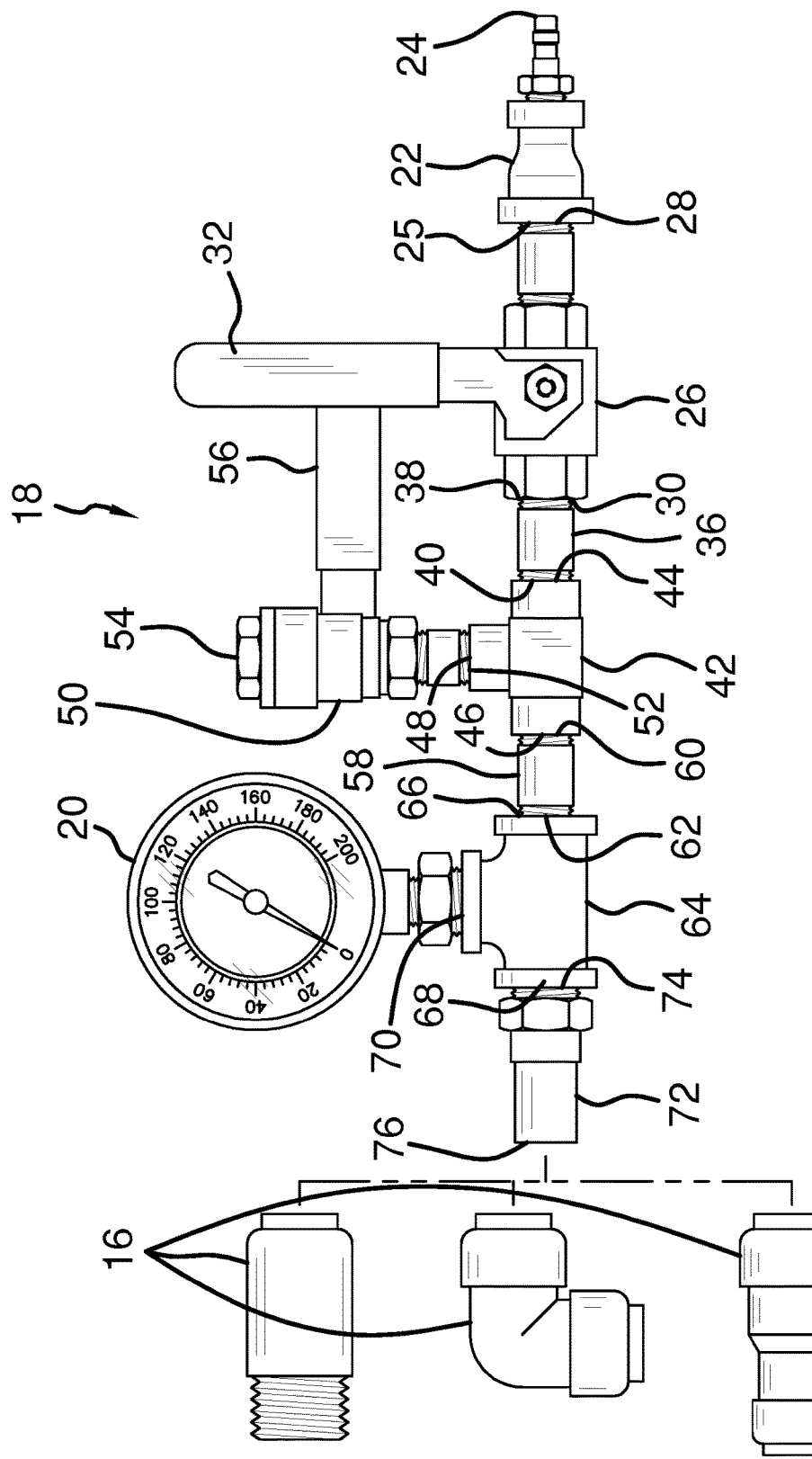
FIG. 2 is a front view of an embodiment of the disclosure.
Figure 3:
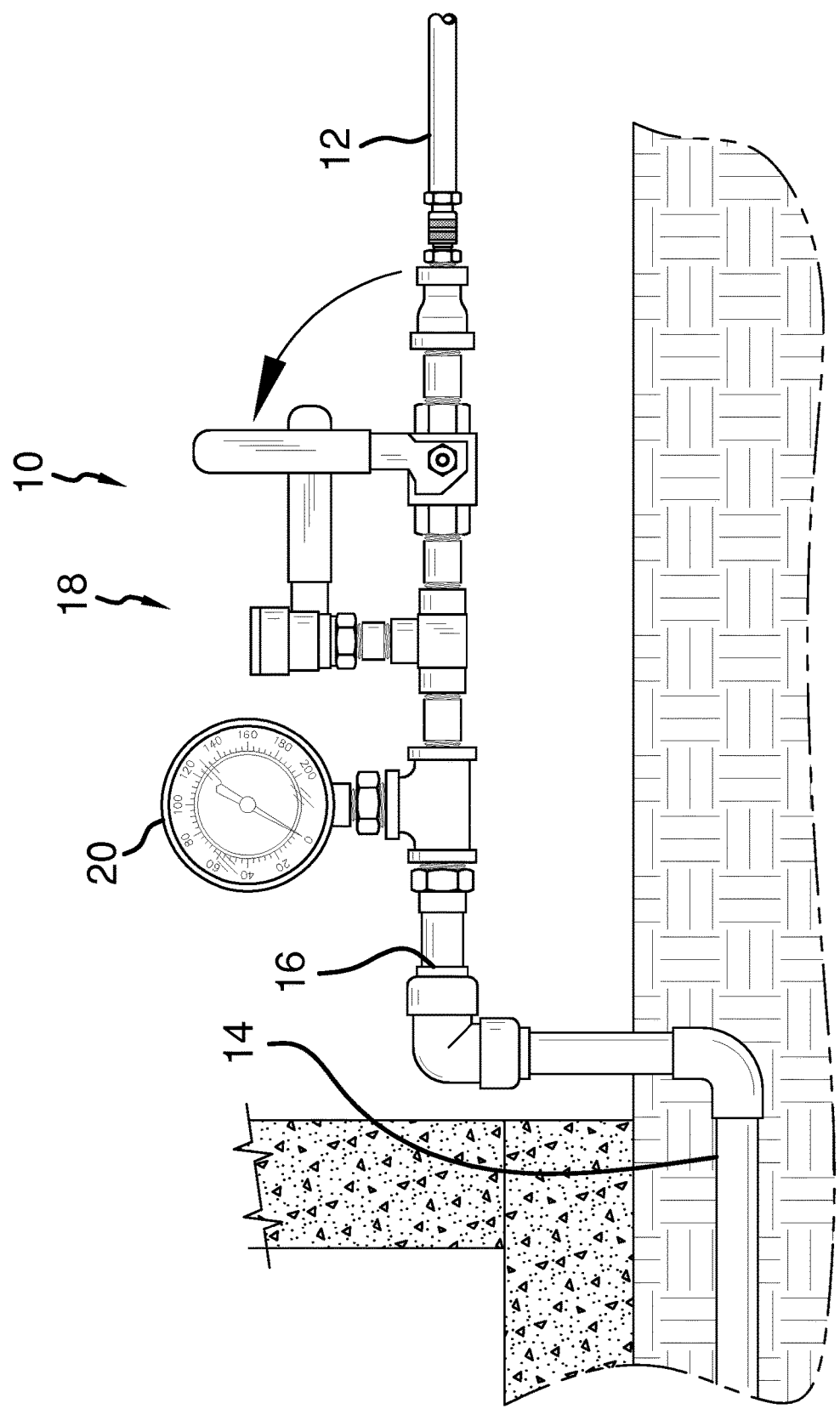
FIG. 3 is a perspective in-use view of an embodiment of the disclosure in a closed position.
Figure 4:
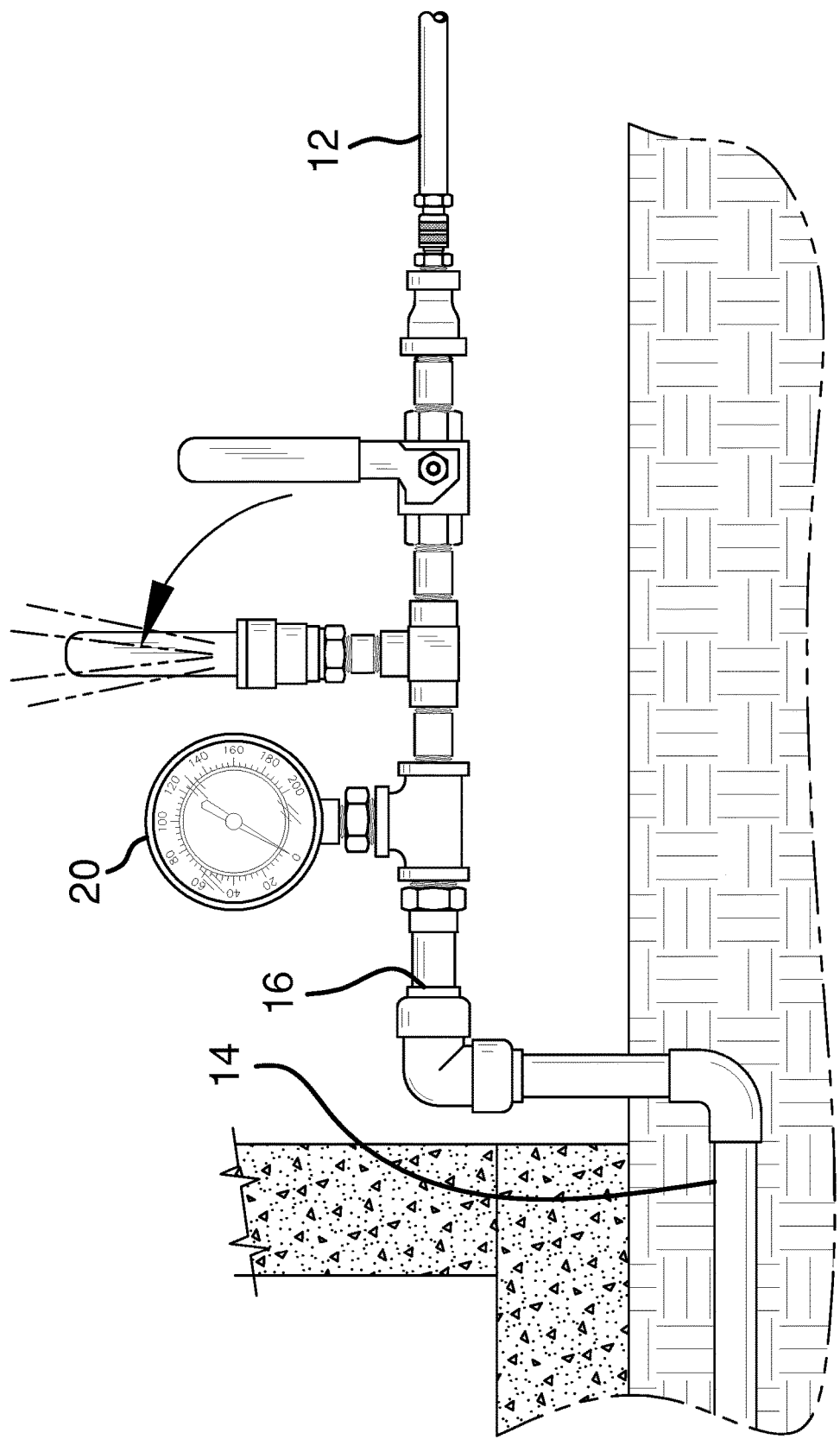
FIG. 4 is a perspective in-use view of an embodiment of the disclosure in an open position.

With reference now to the drawings, and in particular to FIGS. 1 through 4 thereof, a new detection device embodying the principles and concepts of an embodiment of the disclosure and generally designated by the reference numeral 10 will be described.

As best illustrated in FIGS. 1 through 4, the leak detection system 10 generally comprises an air source 12. The air source 12 may be a compressor or the like. A pipe 14 is provided and the pipe 14 is buried underground. The pipe 14 has an inlet 16 and the inlet 16 is exposed with respect to ground. The pipe 14 may be a water pipe 14 for a sprinkler system or the like. The inlet 16 may be a fluid fitting of any conventional design to include, but not being limited to, pvc fluid fittings and copper fluid fittings.

A fitting 18 is provided. The fitting 18 is selectively fluidly coupled between the air source 12 and the inlet 16. Thus, the fitting 18 facilitates the pipe 14 to be pressurized with air. The fitting 18 includes a gauge 20. The gauge 20 communicates air pressure within the pipe 14. Thus, the air pressure in the pipe 14 may be monitored to detect a leak in the pipe 14. The gauge 20 may be a mechanical air pressure gauge 20 or the like.

The fitting 18 comprises an air nozzle 22. The air nozzle 22 has a nipple 24 and an outlet 25. The nipple 24 is selectively fluidly coupled to the air source 12. The air nozzle 22 may be a high pressure hose coupler or the like.

A first valve 26 is provided that has an inlet 28 and an outlet 30. The inlet 28 is fluidly coupled to the outlet 25 of the air nozzle 22. The first valve 26 includes a lever 32. The lever 32 is manipulated between a closed position and an open position. The first valve 26 passes air when the lever 32 is in the open position. The first valve 26 restricts the passage of air when the lever 32 is in the closed position. The first valve 26 may be a ball valve or the like.

A first coupler 36 is provided. The first coupler 36 has an inlet 38 and an outlet 40. The inlet 38 of the first coupler 36 is fluidly coupled to the outlet 30 of the first valve 26. Thus, the first valve 26 selectively allows and restricts air to flow through the first coupler 36. The first coupler 36 may be a copper air fitting or the like.

A first tee 42 is provided. The first tee 42 has an inlet 44, a first outlet 46 and a second outlet 48. The inlet 44 of the first tee 42 is fluidly coupled to the outlet 40 of the first coupler 36. The first tee 42 may be a copper air fitting or the like. The second outlet 48 is oriented at a right angle with respect to the first outlet 46.

A second valve 50 is provided that has an inlet 52 and an outlet 54. The inlet 52 of the second valve 50 is fluidly coupled to the second outlet 48 of the first tee 42. The second valve 50 includes a lever 56. The lever 56 of the second valve 50 may be manipulated between an open position and a closed position. The second valve 50 passes air when the lever 56 of the second valve 50 is in the open position. Thus, the second valve 50 releases the air from the pipe 14 when the fitting 18 is fluidly coupled to the pipe 14. The second valve 50 restricts the passage of air when the lever 56 of the second valve 50 is in the closed position.

A second coupler 58 is provided. The second coupler 58 has an inlet 60 and an outlet 62. The inlet 60 of the second coupler 58 is fluidly coupled to the first outlet 46 of the first tee 42. The second coupler 58 may be a copper air fitting or the like.

A second tee 64 is provided. The second tee 64 has an inlet 66, a first outlet 68 and a second outlet 70. The inlet 66 of the second tee 64 is fluidly coupled to the outlet 62 of the second coupler 58. The second tee 64 may be a copper air fitting or the like. The second outlet 70 of the second tee 64 is oriented at a right angle with respect to the first outlet 68 of the second tee 64. The gauge 20 is fluidly coupled to the second outlet 70 of the second tee 64.

An exhaust 72 is provided. The exhaust 72 has an inlet 74 and an outlet 76. The inlet 74 of the exhaust 72 is fluidly coupled to the first outlet 68 of the second tee 64. The outlet 76 of the exhaust 72 is selectively fluidly coupled to the inlet of the pipe 14. The exhaust 72 may be a half-inch copper air fitting or the like.

In use, the outlet of the exhaust 72 is fluidly coupled to the inlet 16 of the pipe 14. The air source 12 is fluidly coupled to the nipple 24 of the air nozzle 22. The lever 56 on the second valve 50 is manipulated into the closed position. The lever 32 on the first valve 26 is manipulated into the open position to pressurize the pipe 14. The lever 32 on the first valve 26 is then manipulated into the closed position.

The gauge 20 is monitored for a pre-determined amount of time to verify the pipe 14 does not loose air pressure. Thus, the pipe 14 is tested for leaks. The lever 56 on the second valve 50 is manipulated into the open position to de-pressurize the pipe 14. The air source 12 is removed from the air nozzle 22 and the fitting 18 is removed from the pipe 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A leak detection system comprising:
an air source;
a pipe being configured to be buried underground, said pipe having an inlet, said inlet being configured to be exposed with respect to ground; and
a fitting being selectively fluidly coupled between said air source and said inlet wherein said fitting is configured to pressurize said pipe with air, said fitting including a gauge wherein said gauge is configured to communicate air pressure within said pipe thereby facilitating the air pressure to be monitored to detect a leak in said pipe, said fitting comprising:
an air nozzle having a nipple and an outlet, said nipple being selectively fluidly coupled to said air source;
a first valve having an inlet and an outlet, said inlet being fluidly coupled to said outlet of said air nozzle wherein said first valve is configured to be manipulated between a closed position and an open position;
a first coupler having an inlet and an outlet, said inlet of said first coupler being fluidly coupled to said outlet of said first valve wherein said first valve is configured to selectively allow and restrict air to flow through said first coupler;
a first tee having an inlet, a first outlet and a second outlet, said inlet of said first tee being fluidly coupled to said outlet of said first coupler; and
a second valve having an inlet and an outlet, said inlet of said second valve being fluidly coupled to said second outlet of said first tee wherein said second valve is configured to be manipulated between an open position and a closed position thereby facilitating said second valve to release the air from said pipe.

2. The system according to claim 1, further comprising a second coupler having an inlet and an outlet, said inlet of said second coupler being fluidly coupled to said first outlet of said first tee.

3. A leak detection system comprising:
an air source;
a pipe being configured to be buried underground, said pipe having an inlet, said inlet being configured to be exposed with respect to ground; and
a fitting being selectively fluidly coupled between said air source and said inlet wherein said fitting is configured to pressurize said pipe with air, said fitting including a gauge wherein said gauge is configured to communicate air pressure within said pipe thereby facilitating the air pressure to be monitored to detect a leak in said pipe, said fitting comprising:
an air nozzle having a nipple and an outlet, said nipple being selectively fluidly coupled to said air source;
a first valve having an inlet and an outlet, said inlet being fluidly coupled to said outlet of said air nozzle wherein said first valve is configured to be manipulated between a closed position and an open position;
a first coupler having an inlet and an outlet, said inlet of said first coupler being fluidly coupled to said outlet of said first valve wherein said first valve is configured to selectively allow and restrict air to flow through said first coupler;
a first tee having an inlet, a first outlet and a second outlet, said inlet of said first tee being fluidly coupled to said outlet of said first coupler;
a second coupler having an inlet and an outlet, said inlet of said second coupler being fluidly coupled to said first outlet of said first tee; and
a second tee having an inlet, a first outlet and a second outlet, said inlet of said second tee being fluidly coupled to said outlet of said second coupler.

4. The system according to claim 3, further comprising said gauge being fluidly coupled to said second outlet of said second tee.

5. The system according to claim 3, further comprising an exhaust having an inlet and an outlet, said inlet of said exhaust being fluidly coupled to said first outlet of said second tee, said outlet of said exhaust being selectively fluidly coupled to said inlet of said pipe.

6. A leak detection system comprising:
- an air source;
- a pipe being configured to be buried underground, said pipe having an inlet, said inlet being configured to be exposed with respect to ground; and
- a fitting being selectively fluidly coupled between said air source and said inlet wherein said fitting is configured to pressurize said pipe with air, said fitting including a gauge wherein said gauge is configured to communicate air pressure within said pipe thereby facilitating the air pressure to be monitored to detect a leak in said pipe, said fitting comprising:
  - an air nozzle having a nipple and an outlet, said nipple being selectively fluidly coupled to said air source;
  - a first valve having an inlet and an outlet, said inlet being fluidly coupled to said outlet of said air nozzle wherein said first valve is configured to be manipulated between a closed position and an open position;
  - a first coupler having an inlet and an outlet, said inlet of said first coupler being fluidly coupled to said outlet of said first valve wherein said first valve is configured to selectively allow and restrict air to flow through said first coupler;
  - a first tee having an inlet, a first outlet and a second outlet, said inlet of said first tee being fluidly coupled to said outlet of said first coupler;
  - a second valve having an inlet and an outlet, said inlet of said second valve being fluidly coupled to said second outlet of said first tee wherein said second valve is configured to be manipulated between an open position and a closed position thereby facilitating said second valve to release the air from said pipe;
  - a second coupler having an inlet and an outlet, said inlet of said second coupler being fluidly coupled to said first outlet of said first tee;
  - a second tee having an inlet, a first outlet and a second outlet, said inlet of said second tee being fluidly coupled to said outlet of said second coupler;
  - said gauge being fluidly coupled to said second outlet of said second tee; and
  - an exhaust having an inlet and an outlet, said inlet of said exhaust being fluidly coupled to said first outlet of said second tee, said outlet of said exhaust being selectively fluidly coupled to said inlet of said pipe.

* * * * *